United States Patent
Xie et al.

(10) Patent No.: US 10,157,711 B2
(45) Date of Patent: Dec. 18, 2018

(54) COVALENTLY-GRAFTED POLYANILINE ON GRAPHENE OXIDE SHEETS AND ITS APPLICATION IN ELECTROCHEMICAL SUPERCAPACITORS

(71) Applicant: Indiana University Research and Technology Corporation, Indianapolis, IN (US)

(72) Inventors: Jian Xie, Carmel, IN (US); Zhe-Fei Li, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 165 days.

(21) Appl. No.: 15/021,130

(22) PCT Filed: Sep. 10, 2014

(86) PCT No.: PCT/US2014/054887
§ 371 (c)(1),
(2) Date: Mar. 10, 2016

(87) PCT Pub. No.: WO2015/038570
PCT Pub. Date: Mar. 19, 2015

(65) Prior Publication Data
US 2016/0225538 A1 Aug. 4, 2016

Related U.S. Application Data

(60) Provisional application No. 61/876,422, filed on Sep. 11, 2013.

(51) Int. Cl.
*C01B 32/184* (2017.01)
*B82Y 40/00* (2011.01)
(Continued)

(52) U.S. Cl.
CPC ......... *H01G 11/36* (2013.01); *C08G 73/0266* (2013.01); *C08G 83/001* (2013.01);
(Continued)

(58) Field of Classification Search
CPC ..... B82Y 40/00; C01B 32/184; C01B 32/198; C01B 32/182; C01B 32/192; C01B 32/194; C01B 2204/32; C08G 73/0266
(Continued)

(56) References Cited

PUBLICATIONS

Remyamol "Synthesis and nonlinear optical properties of reduced graphene oxide covalently functionalized with polyaniline." Carbon, 59, 308-314, Mar. 21, 2013 (Year: 2013).*
Li "Enhanced Electrochemical Capacitance of Graphene Nanosheets Coating With Polyaniline for Supercapacitors." Int. J. Electrochem. Sci., 7 (2012) 5163-5171 (Year: 2012).*
(Continued)

*Primary Examiner* — Tri V Nguyen
(74) *Attorney, Agent, or Firm* — C. John Brannon; Brannon Sowers & Cracraft PC

(57) ABSTRACT

A method for synthesizing a graphene-polyaniline hybrid composite, including oxidatively exfoliating natural graphite flakes to yield a graphene body, functionalizing the surface of a graphene substrate with aniline groups wherein the surface of the graphene body is functionalized with aniline groups via a diazonium reaction, and polymerizing the aniline groups, wherein covalently-grafted polyaniline-graphene nanocomposites are formed by in-situ polymerization of aniline in the presence of aniline-functionalized graphene oxide, an oxidant, and an acid dopant.

5 Claims, 15 Drawing Sheets

(51) Int. Cl.
*C08G 73/02* (2006.01)
*H01G 11/36* (2013.01)
*C08G 83/00* (2006.01)
*H01G 11/24* (2013.01)
*H01G 11/48* (2013.01)
*H02J 7/00* (2006.01)

(52) U.S. Cl.
CPC ............ *H01G 11/24* (2013.01); *H01G 11/48* (2013.01); *H02J 7/0068* (2013.01); *Y02E 60/13* (2013.01); *Y02T 10/7022* (2013.01)

(58) Field of Classification Search
USPC ................... 252/502, 511; 423/415.1, 460
See application file for complete search history.

(56) References Cited

PUBLICATIONS

Kumar "Polyaniline-Grafted Reduced Graphene Oxide for Efficient Electrochemical Supercapacitors." ACSNano,6(2),1715-1723. Year: 2012).*

Lomeda "Diazonium Functionalization of Surfactant-Wrapped Chemically Converted Graphene Sheets." JACS,130, pp. 16201-16206 , 2008. (Year: 2008).*

Liu "Three-dimensional graphene/polyaniline composite material for high-performance supercapacitor applications." Materials Science and Engineering B 178 (2013) 293-298 (Year: 2013).*

Xue "Structure-Based Enhanced Capacitance: In Situ Growth of Highly Ordered Polyaniline Nanorods on Reduced Graphene Oxide Patterns." Adv. Funct. Mater. 2012, 22, 1284-1290 (Year: 2012).*

* cited by examiner

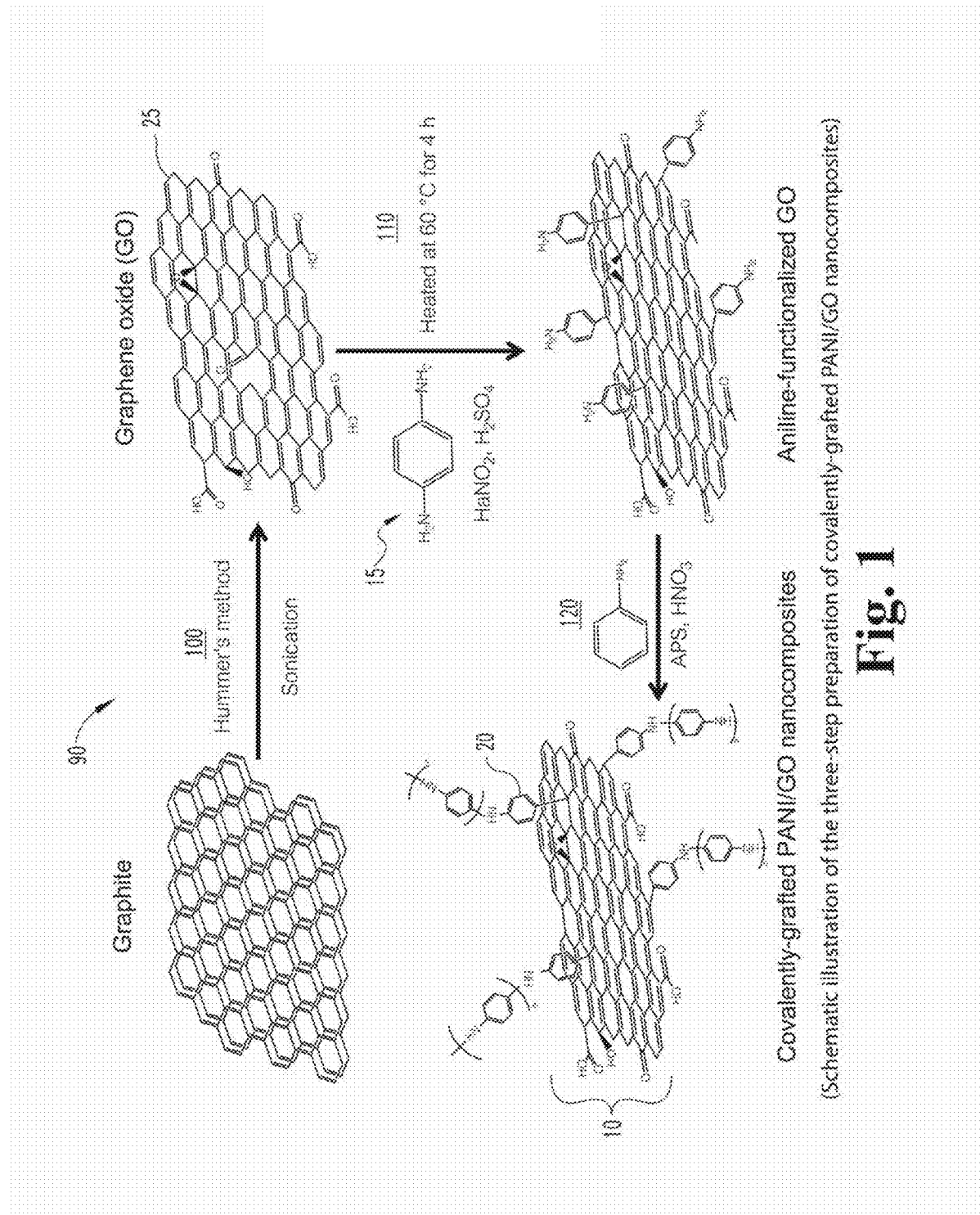

SEM image: Covalently-grafted PANI/GO composite

SEM image: Noncovalently-grafted PANI/GO composite

SEM image: Covalently-grafted PANI/GO composite

SEM image: Covalently-grafted PANI/GO composite

XPS spectra of GO, PANI, aniline-functionalized GO, and covalently-grafted PANI/GO TGA curves of GO, PANI, and covalently-grafted PANI/GO synthesized with different weight ratios at a heating rate of 10°C/min in air.

TEM image: GO

TEM image: Covalently-grafted PANI/GO at an aniline-to-GO ratio of 1:1

TEM image: Covalently-grafted PANI/GO at an aniline-to-GO ratio of 2:1

TEM image: Covalently-grafted PANI/GO at an aniline-to-GO ratio of 4:1

TEM image: Covalently-grafted PANI/GO at an aniline-to-GO ratio of 6:1

TEM image: Covalently-grafted PANI/GO at an aniline-to-GO ratio of 8:1

TEM image: Covalently-grafted PANI/GO at an aniline-to-GO ratio of 10:1

TEM image: PANI

Pore size distribution of PANI and covalently-grafted PANI/GO composites.

Galvonostatic charge/discharge curves of PANI and covalently-grafted PANI/GO composites at a current of 2 A/g Specific capacitance based on the total weight of GO and PANI as a function of the weight percentage of PANI in the composites.

Plot of specific capacitance vs. current density for PANI and PANI/GO (6:1) electrodes Cycling stability of PANI and PANI/GO composites (6:1)

Covalently-grafted polyaniline on graphene oxide sheets and its application in electrochemical supercapacitors

COVALENTLY-GRAFTED POLYANILINE ON GRAPHENE OXIDE SHEETS AND ITS APPLICATION IN ELECTROCHEMICAL SUPERCAPACITORS

CROSS-REFERENCE TO RELATED APPLICATIONS

This patent application is a U.S. Nationalization of, and claims priority to co-pending PCT Patent Application No. PCT/US2014/54887, filed on Sep. 10, 2014, which claimed priority to then co-pending U.S. Provisional Patent Application Ser. No. 61/876,422, filed on Sep. 11, 2013, the content of which is incorporated by reference herein.

TECHNICAL FIELD

The novel technology relates generally to materials science, and, more particularly, to a high surface area graphene composite material.

BACKGROUND

Because of the increasing demand of electrical/hybrid vehicles, tremendous effort has been devoted to the development of energy storage devices with high-energy density and good durability. Conventional energy storage devices, for example, batteries, have limitations such as short cycle life, relatively slow charging/discharging currents (i.e. low power), and slow response to fast charging/discharging. Electrochemical supercapacitors have attracted much attention due to their excellent cycling performance, higher power density, and fast response. Supercapacitors are typically one of two types. The first is the interfacial double-layer capacitance with electric charge storage on high-surface-area carbon materials. The second is pseudocapacitance, which is associated with the redox reaction of metal oxides or conducting polymers. Among the pseudocapacitance candidate materials, much effort has been dedicated to the construction of supercapacitors using polyaniline (PANI). PANI has been considered as one of the most promising and versatile conducting polymers for supercapacitor applications because of its high capacitance, low cost, and easy synthesis. Although PANI possesses high theoretical capacitance of 2000 F/g, compared to many other microporous/mesoporous materials, PANI generally has a relatively low surface area, which limits the accessible surface area of PANI for electrolyte ions. PANI also suffers from poor cycling stability caused by swelling and shrinking of the polymer backbone during charging/discharging. These drawbacks greatly hinder the use of PANI as the supercapacitor electrode in practical applications. Thus, there remains a need for improved PANI materials for use in electrode and electrochemical applications. The present novel technology addresses this need.

SUMMARY

The present novel technology relates to graphene-based composite materials. One object of the present invention is to provide improved graphene-based composite materials for electrochemical capacitors. Related objects and advantages of the present invention will be apparent from the following description.

BRIEF DESCRIPTION OF THE DRAWINGS

FIG. 1 is a schematic illustration of the process of the preparation of covalently grafted polyaniline-graphene nanocomposit material according to a first embodiment of the present novel technology.

DETAILED DESCRIPTION OF THE PREFERRED EMBODIMENTS

Figure 2A:
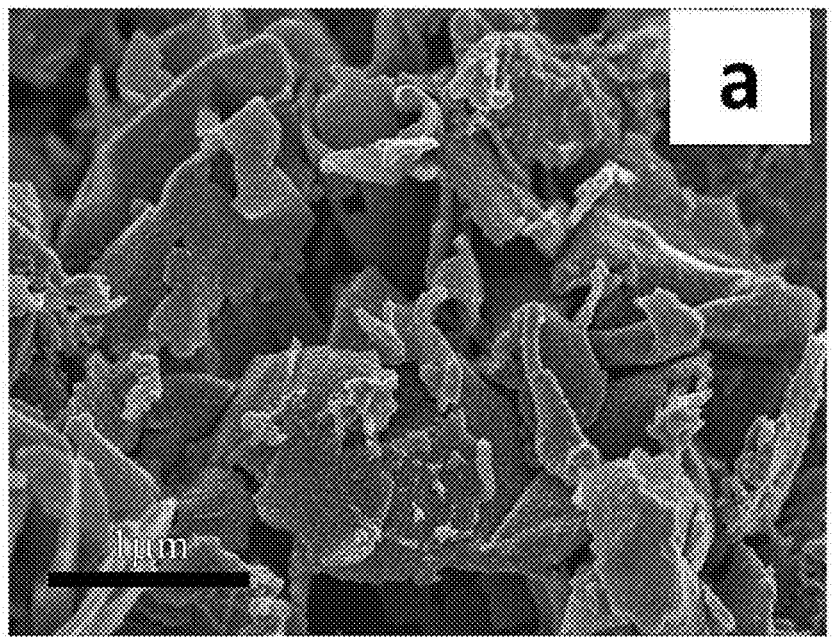
FIG. 2A is a first photomicrograph of the covalently grafted polyaniline-graphene nanocomposit material of the present invention.
Figure 2B:
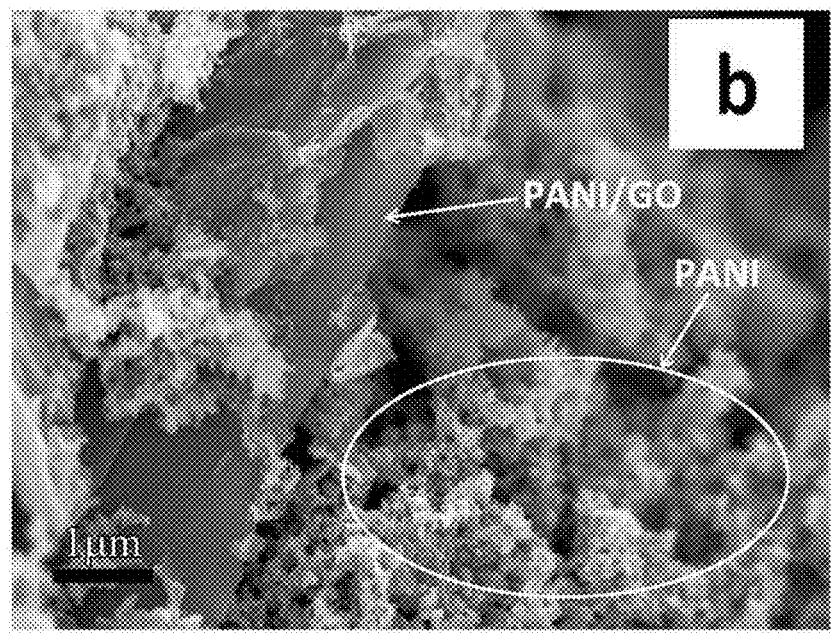
FIG. 2B is a first photomicrograph of a noncovalently bonded polyaniline-graphene nanocomposit material.
Figure 2C:
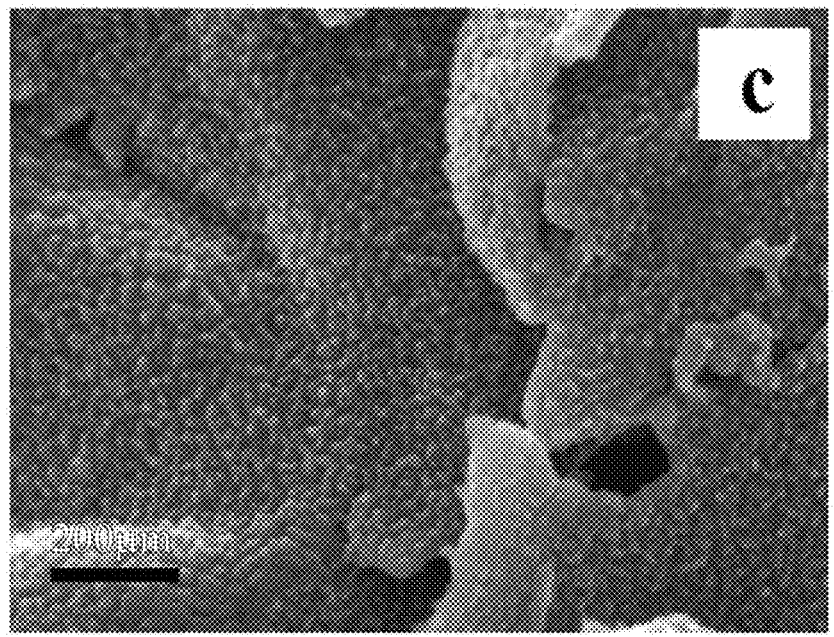
FIG. 2C is a second photomicrograph of the covalently grafted polyaniline-graphene nanocomposit material of the present invention.
Figure 2D:
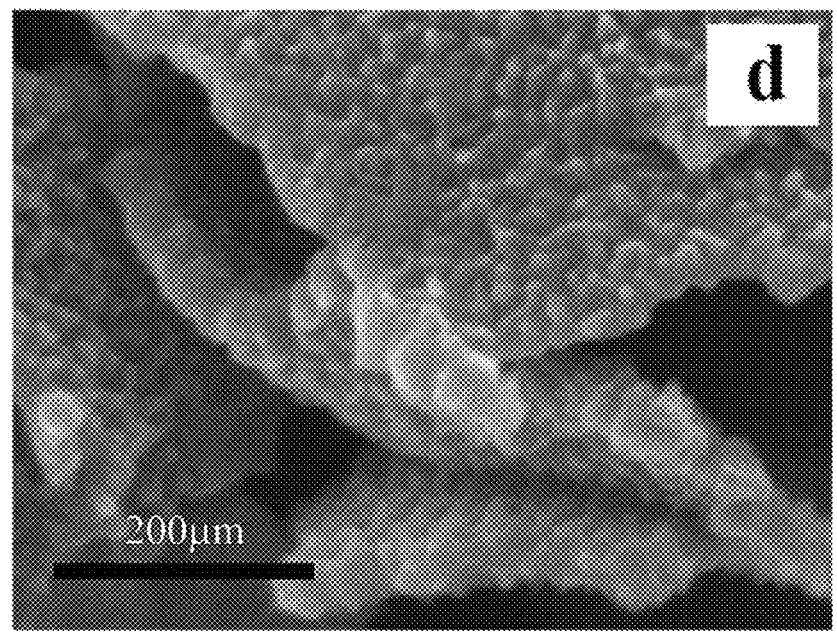
FIG. 2D is a third photomicrograph of the covalently grafted polyaniline-graphene nanocomposit material of the present invention.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Recently, graphene, a single-atom-thick honeycomb structure of sp2-hybrized carbon atoms, has attracted attention due to its high surface area, mechanical strength, conductivity, and stability. These properties render graphene extremely promising for electrochemical energy storage, especially supercapacitors. A great deal of interest has been paid to graphene oxide (GO). GO can be produced by the chemical treatment of graphite through oxidation and subsequent exfoliation in water into single-layer sheets by mechanical agitation. The polar oxygen-containing functional groups (epoxide hydroxyl, carboxyl, and the like) render GO strongly hydrophilic and dispersible. Existing surface functionalities on GO can contribute to some pseudocapacitance as supercapacitor electrodes. Moreover, the existence of various functionalities on GO allows further modification to fabricate composite materials for different applications. For instance, graphene/PANI nanocomposites have been prepared by mechanical mixing, in situ electropolymerization, noncovalent functionalization, and a covalent grafting method via acyl chemistry. The synergistic effect between PANI and graphene/GO can significantly enhance the performance of the resulting composites. However, without carefully controlling the synthetic route, a phase separation between PANI and graphene/GO may occur, which greatly decreases this synergistic effect.

As illustrated in FIGS. 1-10, the present novel technology relates to a simple three-step route to achieving covalently-grafted polyaniline (PANI)/graphene oxide (GO) nanocomposites 10. The synthesized composites 10 typically have a uniform hierarchical morphology of the PANI thin film 15 as well as short nanorods 20 densely grown on the GO sheets 25, in contrast to the nonuniform morphology of noncovalently-grafted PANI/GO. Due to the introduction of GO, the covalently-grafted PANI/GO composites 10 typically exhibit higher surface area and larger pore volume compared with PANI alone. These features enable the increased exposure of PANI to the electrolyte ions, resulting in a more accessible PANI surface for redox reaction species and faster ion transport. The PANI utilization is thus increased, resulting in excellent electrochemical performance (capacitance 442 F/g of PANI/GO (6:1) vs. 226 F/g of pure PANI) and improved cycling stability (83% @ 2000 cycles of PANT/GO (6:1) vs. 54.3% @ 1000 cycles of pure PANI) in electrochemical capacitors utilizing the same. Excellent electrochemical performance demonstrates the advantage of the PANI/GO composites 10 prepared via this covalent grafting method.

In the present novel technology, a facile chemical route is utilized to prepare covalently-grafted PANI/GO nanocomposites 10 using in-situ polymerization of aniline initiated on aniline-functionalized GO sheets. This technique involves first the functionalization of GO with p-phenyldiamine via a diazonium reaction, followed by an in-situ polymerization of aniline in the presence of aniline-functionalized GO, an acid dopant, and an oxidant ammonium persulfate (APS). The prepared covalently-bonded PANI/GO composites exhibited a hybrid morphology, which consists of PANI thin film grown on GO nanosheets with densely vertically-grown PANI nanorods on the GO. The unique structure of this composite material is expected to maximize the synergistic effect between PANI and GO, leading to enhanced performance in supercapacitor electrodes.

The three-step technique 90 for the preparation of covalently-grafted PANI/GO nanocomposites 10 from natural graphite flakes and an aniline monomer is illustrated in FIG. 1. GO was first prepared by the oxidative exfoliation 100 of natural graphite flakes using a modified Hummer's method. Then the surface of the GO 25 was functionalized 110 with aniline groups via a diazonium reaction. The surface functionalization of carbons with aryl diazonium salts has been demonstrated previously. Finally, covalently-grafted PANI/GO nanocomposites 10 were synthesized by in-situ polymerization 120 of aniline in the presence of aniline-functionalized GO, an oxidant, and an acid dopant at room temperature for 8 hours. Several covalently-grafted PANI/GO composites 10 were synthesized with different aniline/GO weight ratios, ranging from 1:1 to 10:1. In comparison, noncovalently-grafted PANI/GO was also prepared under the same conditions, except pristine GO was used. Scanning Electron Microscopy (SEM) was carried out to examine the morphology of both the covalently-grafted composites 10 and the noncovalently-grafted PANI/GO composites (aniline/GO ratio of 10:1). The covalently-grafted PANI/GO 10 exhibited a homogeneous hierarchical morphology of a layered structure and vertically grown nanorods densely packed on the graphene plane (FIGS. 1A, 1C, 1D). Although there exists a small portion of similar hybrid morphology in noncovalently-grafted PANI/GO, the phase separation between PANI and GO is demonstrated by the presence of the PANI aggregates (as the arrow indicates in FIG. 1B). The formation of a different morphology can be explained by the classic nucleation theory. According to classic nucleation theory, homogeneous nucleation occurs when a supersaturation of nuclei at a critical size is achieved. As the PANI grows into a critical size, the nucleation between oligomer/polymer nuclei may occur, followed by further aggregation and precipitation of PANI aggregated particles. In the case of the polymerization 120 of aniline on nonfunctionalized GO 25, a small portion of PANI nuclei might have been initially formed near the surface of the GO 25 due to the static attraction force and van der Waals force; although, many more nuclei were involved in the solution. Thus, as the polymerization proceeded, nucleation occurred simultaneously on the PANI nuclei that were formed either near the GO or in the solution, leading to the formation of two distinct morphologies (FIG. 1B: PANI/GO hierarchical structure and PANI aggregates). While synthesizing the covalently-grafted PANI/GO 10, the polymerization 120 of aniline was initiated on the aniline-functionalized GO surface 25, resulting in a large number of active nucleation sites. Further nucleation mostly took place on these active nucleation sites, resulting in the morphology of the layered structure and a much more uniform distribution of vertically grown PANI nanorods 20.

To validate successful functionalization, GO 25, PANI 15, aniline-functionalized GO, and covalently-grafted PANI/GO composites 10 were characterized by Raman spectroscopy and X-ray photoelectron spectroscopy (XPS). The Raman spectrum of the as-prepared GO displays two prominent peaks at 1330 and 1590 cm$^{-1}$. The G band at around 1590 cm$^{-1}$ can be ascribed to sp$^2$ carbons, and the D band at about 1320 cm$^{-1}$ is indicative of the disordered aromatic structure of the sp$^2$ carbons. This disorder can be caused by surface defects, edges, or by the formation of sp$^3$ bonds, as observed in graphene functionalization. The intensity ratio of the D and G band, $I_D/I_G$, is commonly used to determine the defect quantity in graphene materials. In pristine GO, the $I_D/I_G$ was calculated to be about 0.89. After the diazonium reaction, the $I_D/I_G$ of aniline-functionalized GO increased to 0.95, indicative of the sp$^2$ carbon functionalization as a result of the covalent attachment with the aniline groups. Pristine PANI has characteristic peaks at around 800, 1160, 1325, 1466, and 1589 cm$^{-1}$, which can be attributed to ring deformation of the benzene/quinoid rings, C—H bending of the benzene ring, protonated C—N stretching, C=N stretching, and C—C stretching of the benzene/quinoid ring, respectively. In PANI/GO composites 10, only three characteristic peaks of PANI at 1165, 1328, and 1592 cm$^{-1}$ are present. The missing two peaks could be caused by the overlapping of two major peaks of PANI at 1325 and 1589 cm$^{-1}$ with those of GO around 1330 and 1590 cm$^{-1}$. It is possible that the Raman peaks of PANI superimposed on the GO structures is due to the strong interaction between the PANI polymer backbone and the GO nanosheets via π-π stacking. Further, the atomic composition of the samples as analyzed by XPS and the comparative results are shown. Compared to pristine GO, the presence of N (1.8%) in aniline-functionalized GO evidenced successful diazonium functionalization. In addition, a large peak of N 1s can also be observed in the XPS spectrum of the PANI/GO composites 10, suggesting the presence of PANI. The N composition in the resulting composites 10 determined by XPS can be used to estimate the weight percentage of PANI (Table S1). For example, about 44.3 wt % and 93.5 wt % PANI was determined in the composites prepared with the aniline-to-GO ratio of 1:1 and 10:1, respectively. This is consistent with the weight ratios that were used in the synthesis.

Figure 3A:
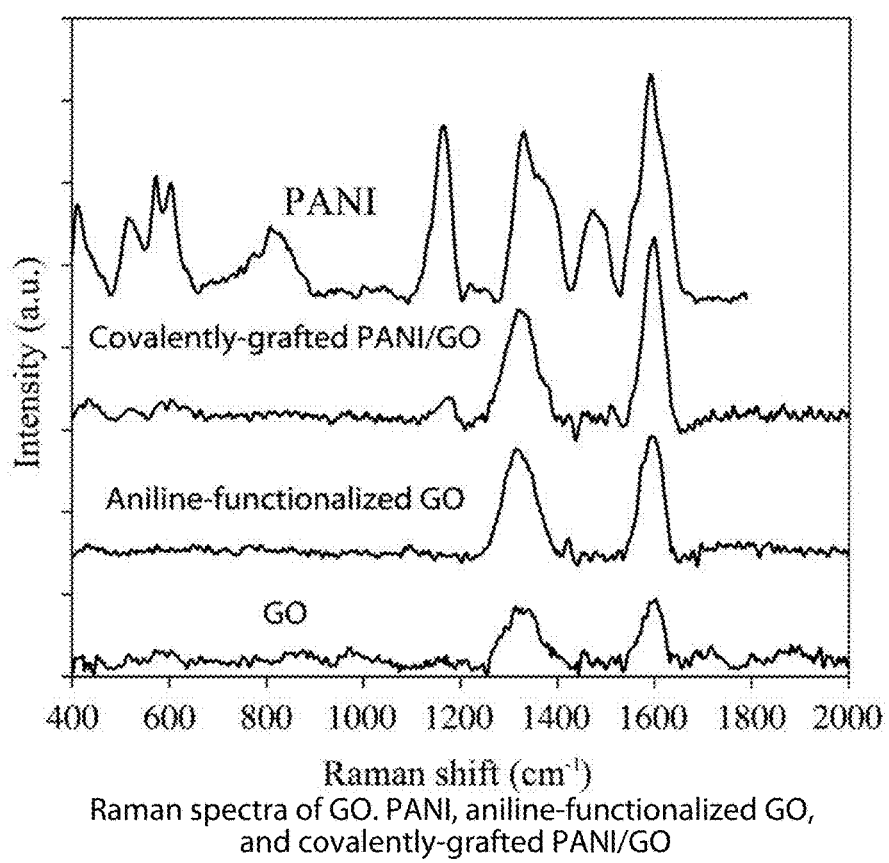
FIG. 3A is a graphical representation of intensity vs. Raman shift for covalently graphed polyaniline-graphene composite material and aniline-functionalized graphene oxide material.
Figure 3B:
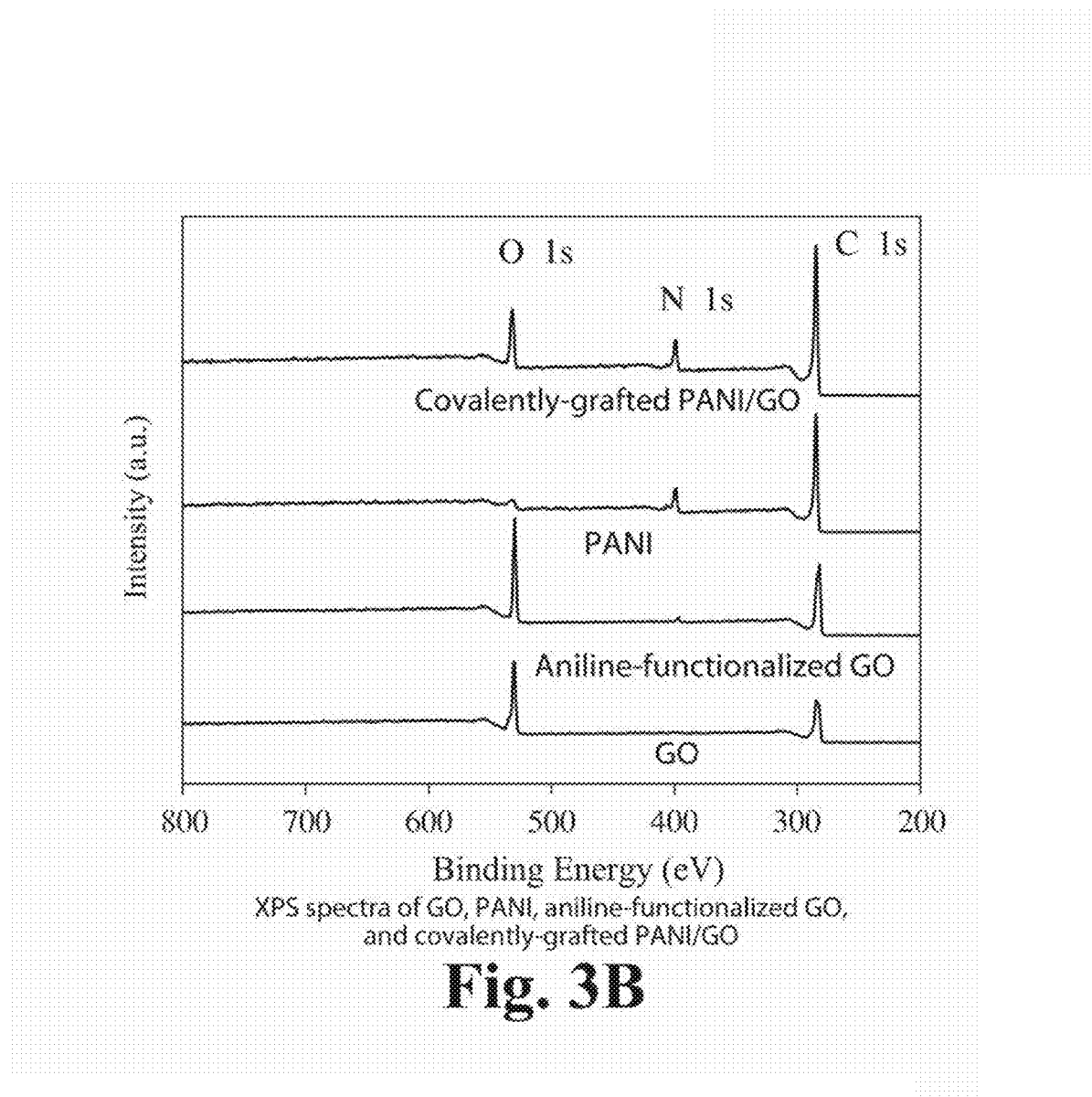
FIG. 3B is a graphical representation of intensity vs. Binding energy for covalently graphed polyaniline-graphene composite material and aniline-functionalized graphene oxide material.

The thermal stability of GO and covalently-grafted PANI/GO composites 10 was examined by thermogravimetric analysis (TGA), shown in FIG. 3. GO is thermally unstable in air above 100° C., which is due to the removal of water residues and pyrolysis of existing oxygen-contain groups. Polyaniline generally exhibits two stages of decomposition. The decomposition before 290° C. is likely due to the loss of moisture and dopant (i.e. HCl). PANI main chains start to decompose above 290° C. The covalently-grafted PANI/GO composites showed typical decomposition stages of weight loss similar to PANI, indicating the successful polymerization of PANI on GO surfaces. Interestingly, the covalently-grafted composites exhibited better thermal stability, which could be attributed to the strong interaction resulting from the π-π stacking force between the GO basal plane and the PANI backbone, and the covalent bonding between the GO and PANI end chains. All of the covalently-grafted composites exhibited slightly better stability (FIG. S2). In contrast, the TGA curve of the noncovalently-grafted composites was similar to that of pure PANI, probably due to the weak synergistic effect resulting from the phase separation between GO and PANI.

Figure 4:
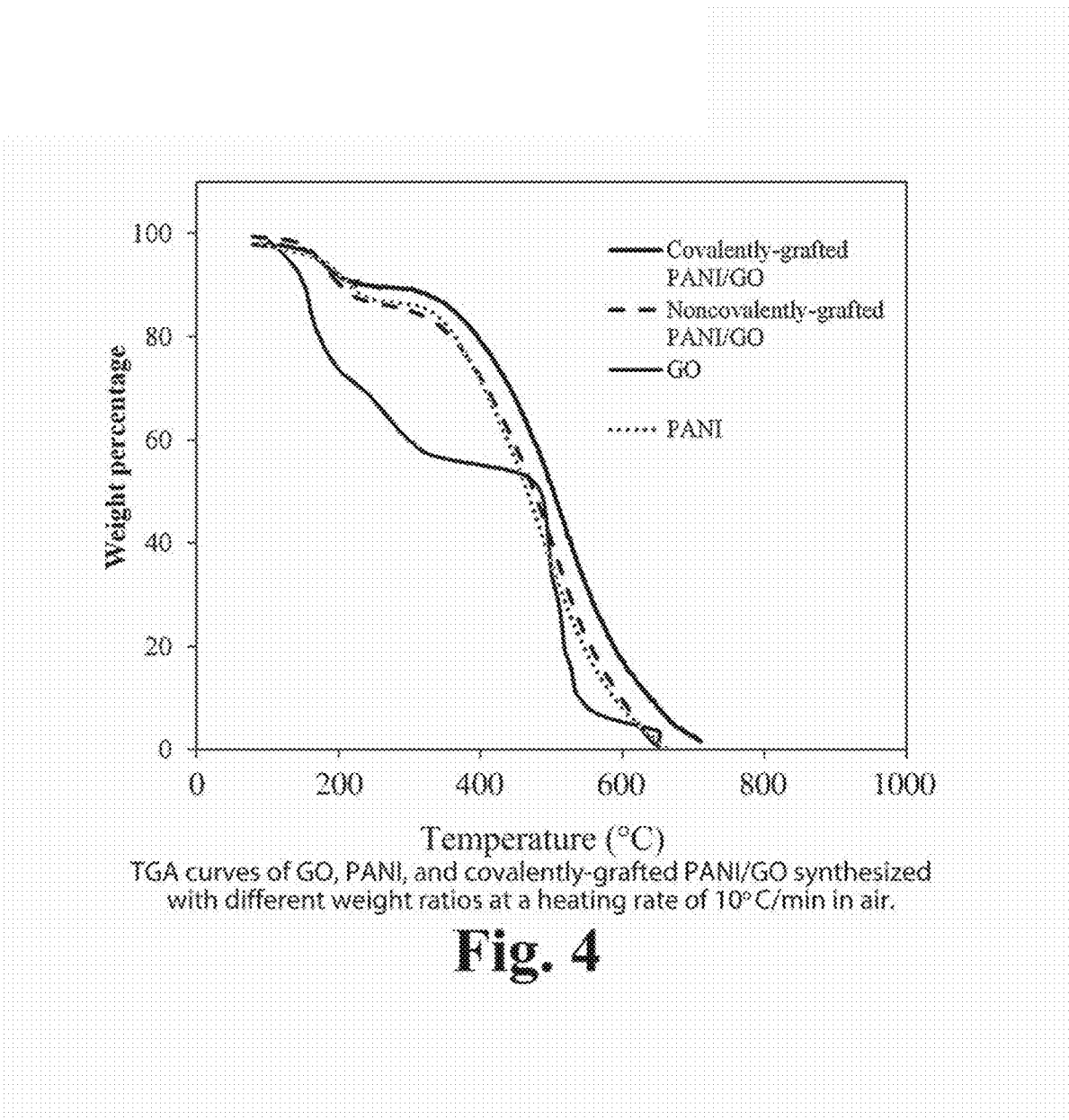
FIG. 4 is a graphical representation of weight percentage vs. temperature for covalently graphed polyaniline-graphene composite material and aniline-functionalized graphene oxide material.
Figure 5A:
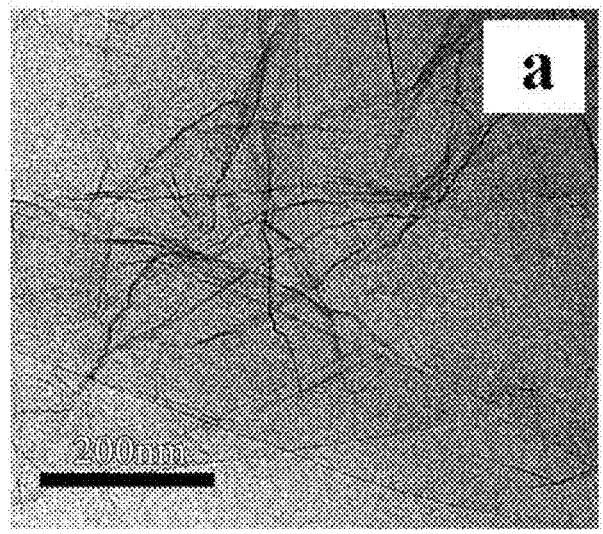
FIG. 5A is a first TEM photomicrograph of graphene oxide.
Figure 5B:
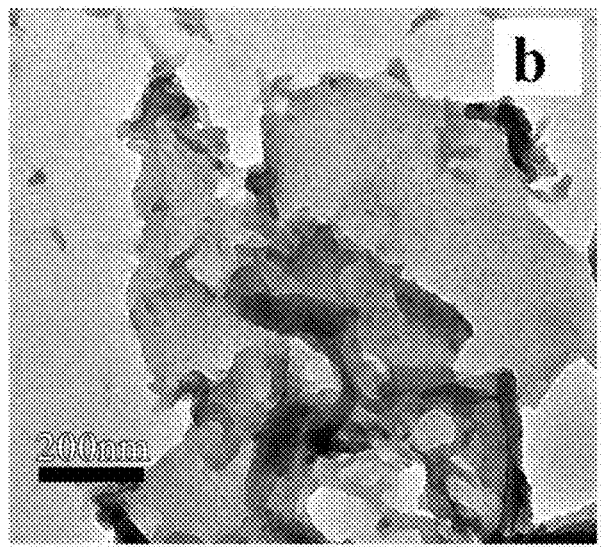
FIG. 5B is a first photomicrograph of a covalently graphed polyaniline-graphene composite material.
Figure 5C:
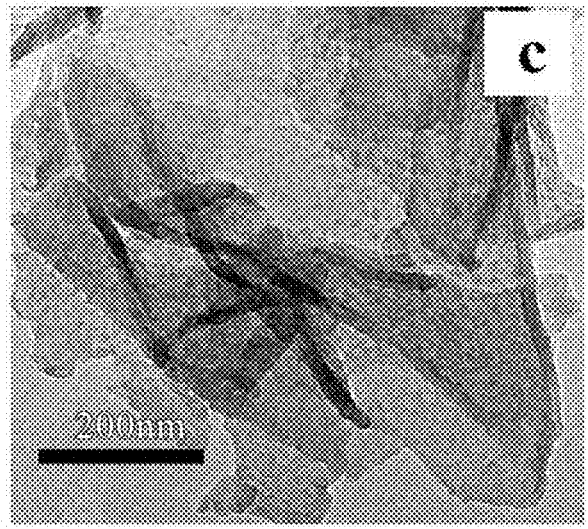
FIG. 5C is a second photomicrograph of a covalently graphed polyaniline-graphene composite material.
Figure 5D:
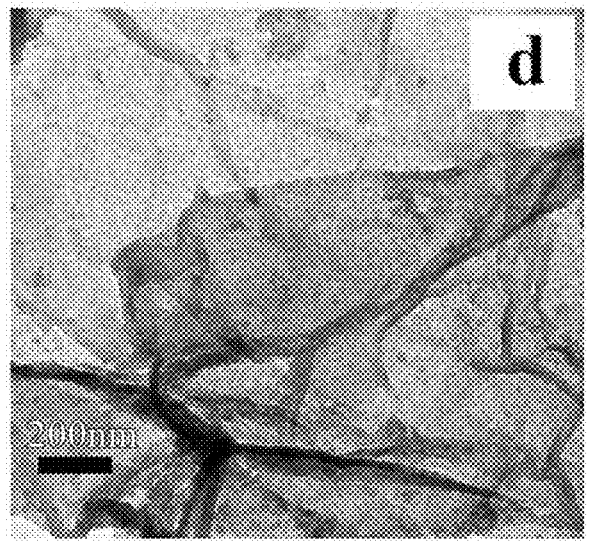
FIG. 5D is a third photomicrograph of a covalently graphed polyaniline-graphene composite material.
Figure 5E:
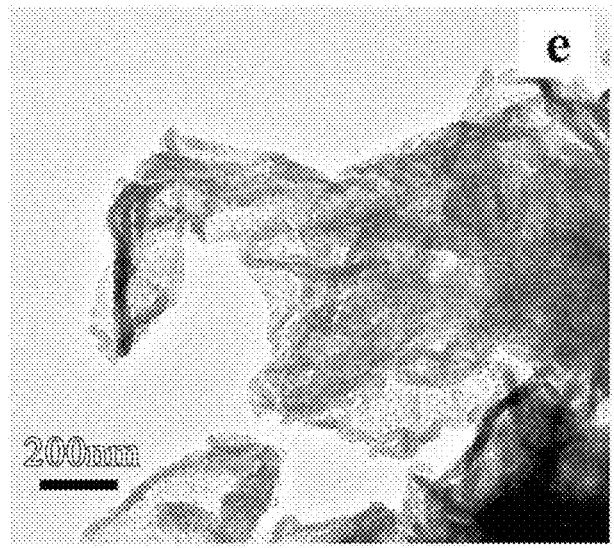
FIG. 5E is a fourth photomicrograph of a covalently graphed polyaniline-graphene composite material.
Figure 5F:
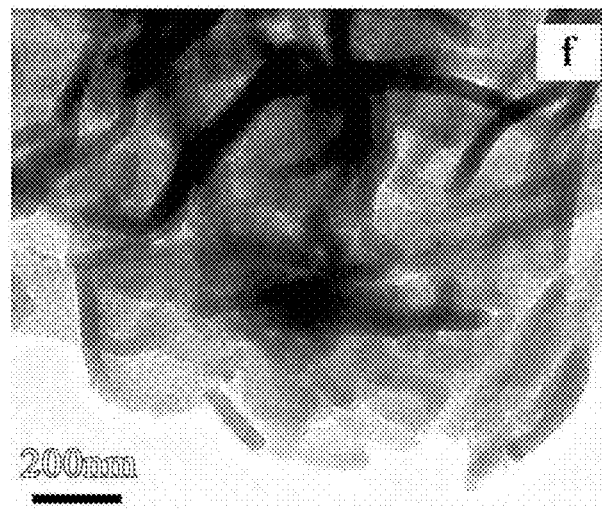
FIG. 5F is a fifth photomicrograph of a covalently graphed polyaniline-graphene composite material.
Figure 5G:
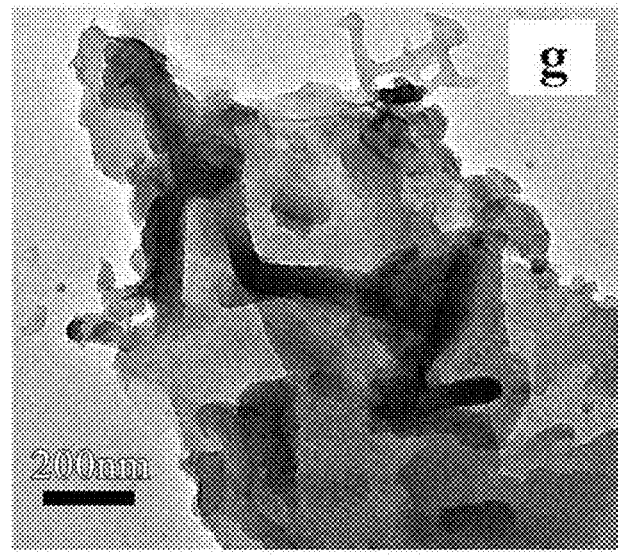
FIG. 5G is a sixth photomicrograph of a covalently graphed polyaniline-graphene composite material.
Figure 5H:
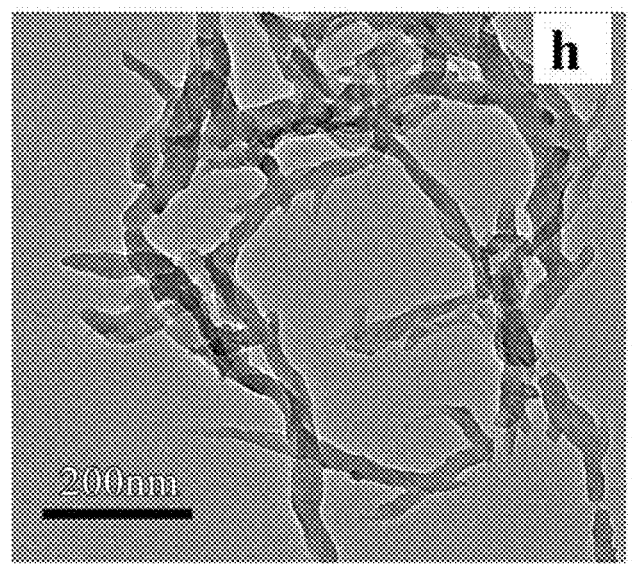
FIG. 5H is a seventh photomicrograph of a covalently graphed polyaniline-graphene composite material.

The morphology of the composites synthesized from different ratios was further investigated by SEM and transmission electron microscopy (TEM), as shown in FIG. 4. The TEM images of GO (FIG. 4A) and PANI (FIG. 4H) showed flat graphene sheets with some wrinkles and aggregated nanofiber morphology, respectively. A hierarchical structure of layered nanosheets and aligned short PANI nanorods was observed in all samples, consistent with the SEM results in FIGS. 1A, 1C, 1D. It can be seen that length and diameter of the nanorods increased with the PANI content in the composites (FIGS. 4B-G). This can be explained by the nucleation theory mentioned above. A large number of active surface nucleation sites were first formed on the aniline-terminated surface. The nucleation mainly occurred on these nucleation sites. The polymerization of aniline continues to propagate on the existing PANI nuclei. Once the aniline in the solution was consumed, the polymerization ended. At a lower aniline/GO ratio (i.e. 1:1), a thin film of PANI on the GO nanosheets forms due to the low aniline/GO ratio and the strong interaction between PANI and GO. At a higher aniline/GO ratio (4:1, 6:1, 8:1), further nucleation may take place on the existing PANI thin film, resulting in the vertically-aligned PANI nanorods. This variation in morphology may lead to the different pore structures of these composites.

To assess the porosity of the covalently-grafted PANI/GO composites, N$_2$ adsorption-desorption isotherms were measured by a surface area analyzer at 77 K. The N$_2$ adsorption-desorption isotherms and the pore size distribution of the as-prepared composites with different PANI contents are shown in FIG. 5. The pure PANI possesses a broad pore size distribution ranging from 0.8 nm to 36 nm. PANI shows a specific surface area of 38 m$^2$/g, pore volume of 0.32 cm$^3$/g, and an average pore size of 57.6 nm. Compared to PANI, the covalently-grafted composites exhibit a similar range of pore size, while showing a much higher surface area and larger pore volumes (FIG. 5, Table 1). The total pore volume and the micropore volume increase, and the average pore size decreases as the GO nanosheets are incorporated. The PANI/GO composites (1:1) have a specific surface area of 127 m$^2$/g, a pore volume of 0.56 cm$^3$/g, and an average pore size of 37.5 nm. It is expected that the large pore volumes of the composites allow rapid electrolyte ion transport, while the high surface area provides the composites with more surface active sites for pseudocapacitance.

Figure 6A:
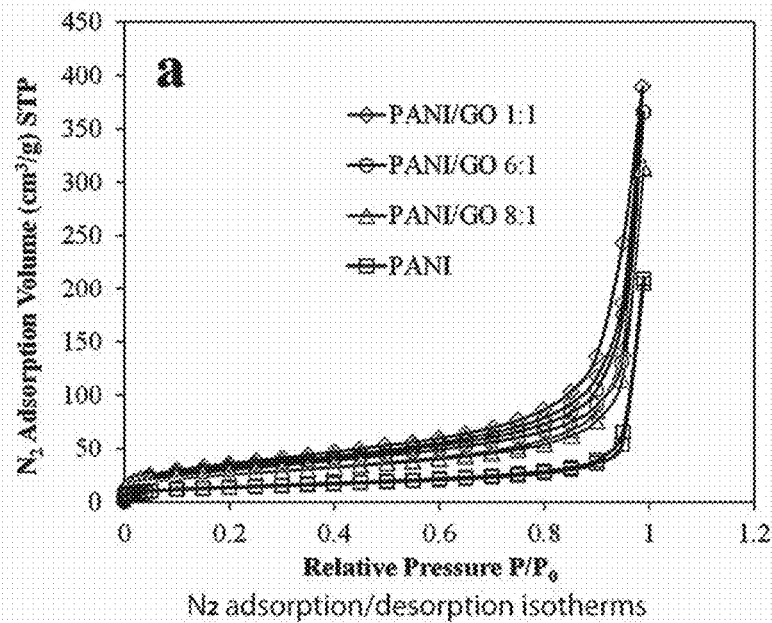
FIG. 6A is a graphical representation of $N_2$ absorption volume vs. relative pressure for covalently graphed polyaniline-graphene composite material and aniline-functionalized graphene oxide material.
Figure 6B:
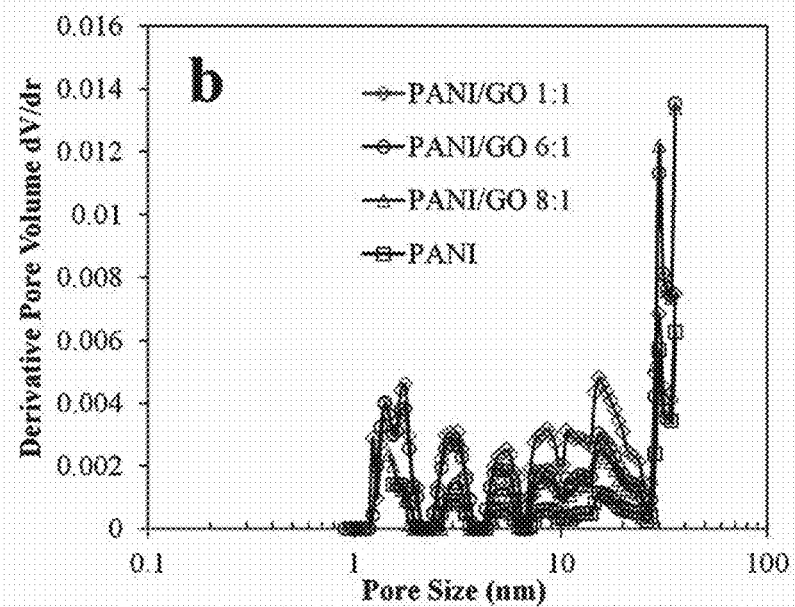
FIG. 6B is a graphical representation of derivative pore volume vs. pore size for covalently graphed polyaniline-graphene composite material and aniline-functionalized graphene oxide material.

To evaluate the advantages of using covalently-grafted PANI/GO nanocomposites 10 as a supercapacitor electrode 150, the electrochemical properties of PANI, GO, and PANI/GO were characterized by cyclic voltammetry (CV), electrochemical impedance spectroscopy (EIS), and a galvanostatic charge/discharge test. FIG. 6A shows cyclic voltammograms (CVs) of the PANI and covalently-grafted PANI/GO (8:1) in 1 M H$_2$SO$_4$ with various scan rates in the range of −0.1 to 0.8 V vs. Ag/AgCl. As shown in FIG. 6A, the capacitance of GO is very small compared to PANI and PANI/GO, due to the low surface area of GO caused by the restacking between the GO sheets. The typical PANI redox peaks (about 0.1 and 0.6 V) are clearly seen in FIG. 6. Both the PANI and PANI/GO composite electrodes exhibit similar pairs of redox peaks, which can be ascribed to the faradaic transition between the different oxidation states of PANI (leucoemeraldine, emeraldine, and pernigraniline). The shape of the CV curve of the PANI/GO composites also indicates that the composites can provide both faradic capacitance and double-layer capacitance, which results from the unique hierarchical structure of the composites. Clearly, the CV curve of the PANI/GO composites is much larger than that of the pure PANI, indicating a higher specific capacitance. To obtain a comprehensive understanding of the capacitive response of the PANI/GO composites, an electrochemical impedance test was conducted and the results are shown in FIG. 6B. The small diameter of the semicircle of the PANI/GO composites in the high frequency region represents the low charge transfer resistance at the interface between the electrode and electrolyte. The nearly vertical arm of the AC impedance in the low frequency region indicates an excellent capacitive behavior, representative of fast ion diffusion and adsorption in/on the electrode material. The low resistance and fast ion diffusion can be attributed to the enhanced specific surface area and the pore structure of the PANI/GO composites which may render this composite material very promising as a supercapacitor electrode.

Figure 7A:
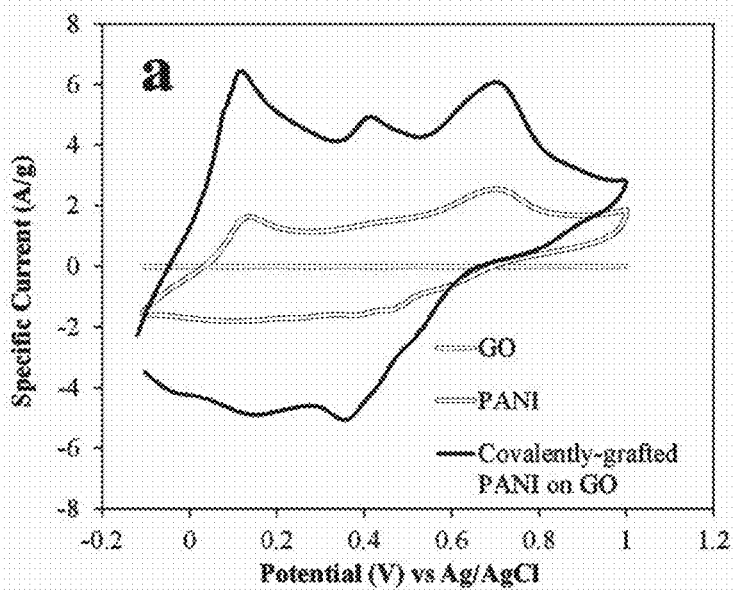
FIG. 7A is a graphical representation of specific current vs. potential for covalently graphed polyaniline-graphene composite material and aniline-functionalized graphene oxide material.
Figure 7B:
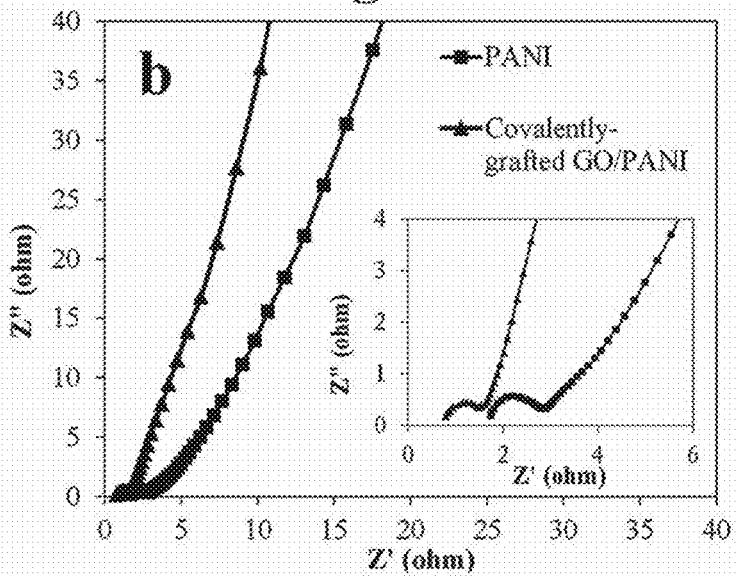
FIG. 7B is a graphical representation of Z" vs. Z' for covalently graphed polyaniline-graphene composite material and aniline-functionalized graphene oxide material.
Figure 8A:
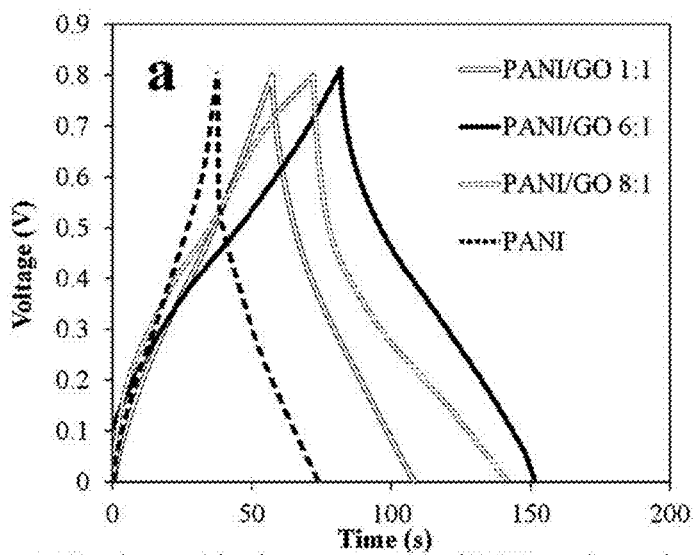
FIG. 8A is a graphical representation of galvanostatic discharge curves for covalently graphed polyaniline-graphene composite material and aniline-functionalized graphene oxide material.
Figure 8B:
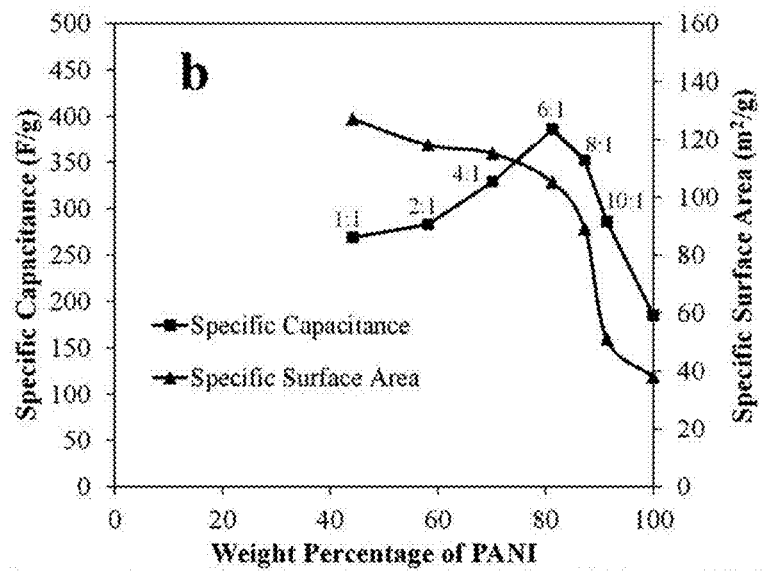
FIG. 8B is a graphical representation of specific capacitance as a function of total weight for covalently graphed polyaniline-graphene composite material and aniline-functionalized graphene oxide material.
Figure 8C:
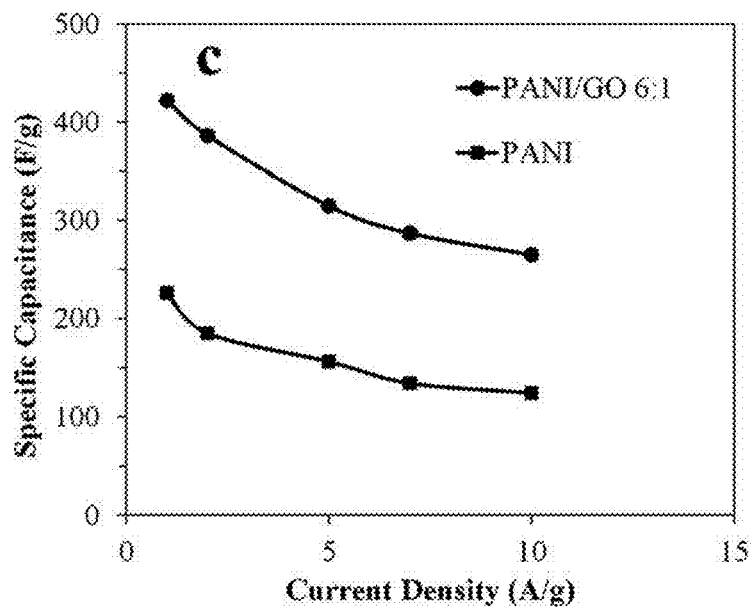
FIG. 8C is a graphical representation of specific capacitance vs. current density for covalently graphed polyaniline-graphene composite material and aniline-functionalized graphene oxide material.
Figure 8D:
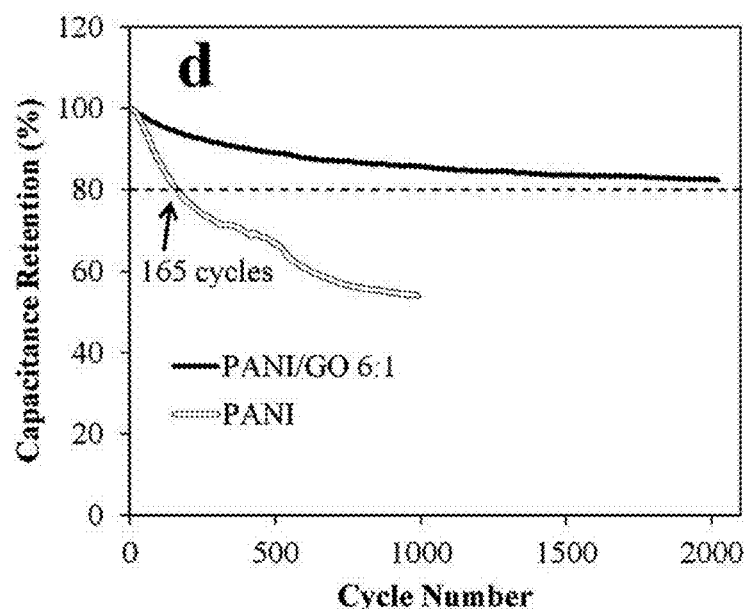
FIG. 8D is a graphical representation of capacitance retention as a function of cycling for covalently graphed polyaniline-graphene composite material and aniline-functionalized graphene oxide material.
Figure 9:
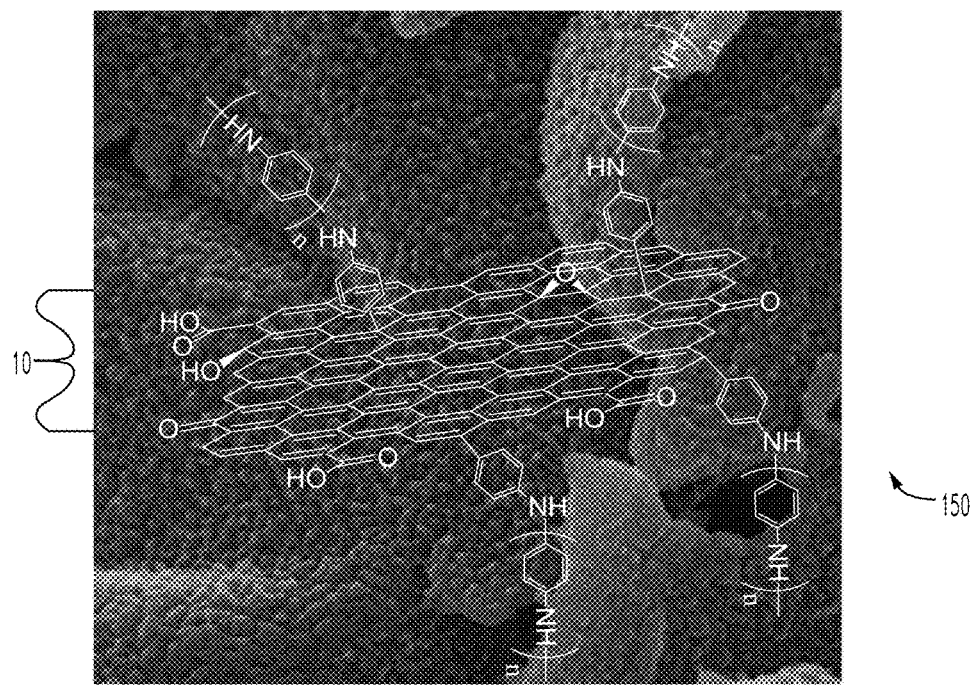
FIG. 9 is a graphical overlay of the structure of the covalently graphed polyaniline-graphene composite material on a photomicrograph of the same.
Figure 10:
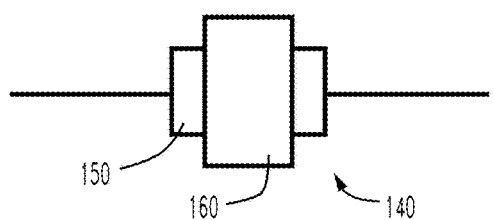
FIG. 10 is a schematic diagram of a supercapacitor system employing the composite material of FIG. 1 as an electrode.

The three-electrode 150 configuration can exaggerate the performance of supercapacitors 160 to some extent. A two-electrode 150 test configuration, instead, is the best method to evaluate the real performance of a supercapacitor system 140. Thus, galvanostatic charge-discharge measurements were also taken in a two-electrode 150 system at various current densities for different PANI/GO composites 10. The influence of the aniline/GO ratio on the specific capacitance was studied by galvanostatic charge/discharge at a current density of 2 A/g. The nonlinear charge/discharge curves indicate the pseudocapacitive behavior of the composites. All PANI/GO composites showed a higher capacitance compared to pure PANI (185 F/g), with the highest capacitance (379 F/g) found in the composites prepared at an aniline/GO ratio of 6:1 (81.3 wt % PANI). The specific capacitance of the PANI/GO composites was determined to increase with the GO content in the composites, maximize, and then decrease. The increase in the capacitance is mainly due to the larger surface area of the composites. The further decrease is probably caused by the decrease in the PANI content. For example, although PANI/GO (4:1) exhibited a slightly higher surface area (115 m$^2$/g) than the PANI/GO (6:1) (105 m$^2$/g), the lower PANI content in the composites (70.1 wt % PANI) is likely to reduce the overall pseudocapacitance. Galvanostatic charge-discharge measurements were also taken at various current densities for the PANI and PANI/GO (6:1) electrodes 150. The corresponding specific capacitance values from the discharge curves based on the mass of active materials is summarized and shown. At a current density of 1 A/g, the specific capacitance of PANI and PANI/GO (6:1) is 226 and 422 F/g, respectively. Even at a high current density of 10 A/g, the PANI/GO (6:1) composite electrodes still maintain a specific capacitance of 265 F/g. The specific capacitance of PANI/GO composites 10 against PANI weight can be estimated based on the weight percentage of PANI in the composites 10. Considering most GO sheets were fully coated by PANI, the capacitance contributed by the GO is neglected here. The specific capacitance of PANI/GO 6:1 (70.1 wt %) against the weight of PANI is calculated to be about 603 F/g at a current density of 1 A/g. For PANI/GO 1:1 (44.3 wt %), the specific capacitance based on the weight of PANI is 783 F/g, which is comparable to the thin PANI film deposited on the graphene hydrogels. IR drop can significantly reduce the energy density and power density of a supercapacitor electrode. Much lower IR drops were observed for the covalently-grafted PANI/GO composites during the charge/discharge tests, indicating low contact resistance and diffusion resistance (FIG. S7). An energy density of 9.6 Wh/kg (1 A/g) and a power density of 3468 W/kg (10 A/g) can be delivered by PANI/GO (6:1) composites, as compared to 4.5 Wh/kg (1 A/g) and a power density of 2945 W/kg (10 A/g) in pure PANI. The higher energy density and power density can be attributed to the increased surface area and pore volume in the composites, allowing a more accessible surface area to the redox species and a faster ion transport within the electrode. The PANI/GO composite electrodes also exhibited good cycling stability. PANI supercapacitors usually suffer from a short cycle life due to the swelling and shrinking of the polymer network during charging and discharging processes. As shown in FIG. 7D, the capacitance retention of PANI decreased to only about 54.3% after 1000 charge/discharge cycles at a current density of 2A/g. In comparison, our PANI/GO (6:1) composite electrodes showed a capacitance retention as high as 83% over 2000 cycles under the same charge/discharge condition. The excellent cycle life could be attributed to the large surface area and pore volume from the unique hierarchical structure, which can accommodate the swelling and shrinking of the polymer network during cycling. The covalent bonding and the strong π-π interaction between the GO and PANI may also play a role in maintaining the electrochemical stability of PANI. Excellent electrochemical performance demonstrates the advantage of the PANI/GO composites prepared via this covalent grafting method.

Regarding the three-step synthesis 90 to prepare covalently-grafted PANI/GO nanocomposites 10 from natural graphite and aniline at room temperatures, covalently-grafted composites 10 formed a uniform hierarchical morphology of PANI nanorods grown on planar GO sheets, in contrast to a nonuniform morphology of nongrafted composites. Compared to pure PANI, the PANI/GO composites 10 possessed a much larger specific surface area and pore volume, which increased the accessible surface area for the redox reaction and allowed faster ion diffusion. This unique hierarchical morphology maximized the synergistic effect between PANI and GO, leading to an enhanced performance as a supercapacitor electrode. The PANI/GO composites prepared with an aniline/GO ratio of 6:1 showed the highest capacitance of 422 F/g at a current density of 1 A/g. The capacitance can be retained at about 83% after 2000 cycles. These covalently-grafted PANI/GO composite materials 10 may be useful for broad applications including energy storage, sensors, biosensors, and catalysis. This facile covalently-grafting method may be utilized to fabricate many other high-performance composites.

EXAMPLES

Synthesis of GO: GO was prepared by a modified Hummer's method. To completely oxidize the graphite, a pre-oxidization was needed prior to the Hummer's method. Graphite flakes (2 g) were mixed with concentrated H$_2$SO$_4$ (10 mL), K$_2$S$_2$O$_8$ (1 g), and P$_2$O$_5$ (1 g). The resulting mixture was constantly stirred, heated at 80° C., and then gradually cooled down to room temperature. The pre-oxidized graphite was filtered, washed with DI water, and dried in an oven at 80° C. This pre-oxidized graphite was then subjected to oxidation by the Hummers' method. The pre-oxidized graphite (2 g), sodium nitrate (1 g), and sulfuric acid (46 mL) were mixed and stirred for 15 min in a 500 mL flask immersed in an ice bath. Potassium permanganate (6 g) was slowly added to the above suspension solution and cooled for another 15 min. Then, DI water (92 mL) was added slowly to the suspension, causing a violent effervescence. The temperature was maintained at about 95-98° C. for 15 min. The suspension was diluted with warm DI water (280 mL) and treated with 30% $H_2O_2$ (10 mL) to reduce the unreacted permanganate. Finally, the resulting suspension was washed by centrifugation with HCl and copious DI water to remove residual salts. Then, the GO dispersion solution was subjected to another centrifugation at 5000 rpm for 5 min to remove the unexfoliated GO. The purified GO was dispersed in DI water at a concentration of 1 mg/mL and sonicated for 1 h to exfoliate the GO. The resulting GO colloid solution is able to remain stable for a few months.

Aniline functionalization of GO: P-phenylenediamine (8 mmol) and $H_2SO_4$ (8 mmol) was dissolved in the GO solution (500 mL). A 5 mL solution containing $NaNO_2$ (8 mmol) was added dropwise to the solution. The solution was stirred and heated at 65° C. for 4 h. The resulting aniline-functionalized GO was centrifuged, washed with DI water, and freeze dried.

Synthesis of covalently-grafted PANI/GO nanocomposites: The aniline-functionalized GO (100 mg), the aniline monomer (at different aniline/GO ratios), and the HCl was dispersed in DI water (100 mL). A solution of the oxidant, $(NH_4)_2S_2O_8$ (APS), was rapidly added into the above dispersion. The molar ratio of aniline:APS:HCl was kept at 1:0.5:2. The solution was vigorously shaken for 10 s and left undisturbed to react for 24 h. After the reaction was completed, the precipitated product was filtered, washed with DI water, and dried. For comparison, the nongrafted PANI/GO composites were synthesized following the same procedure, except that pristine GO was used.

Characterization: The morphology of the graphene and the graphene-PANI nanocomposites was characterized by TEM and SEM. Raman spectra were also taken by spectrometer with laser excitation at 785 nm. The XPS spectra were recorded by an X-ray photoelectron spectrometer. TGA curves were also obtained using. The N2 adsorption/desorption isotherms were measured at 77 K. The Brunauer-Emmett-Teller (BET) specific surface area was calculated using adsorption data at the relative pressure range of 0.05-0.2. The micropore volumes were estimated from the amount adsorbed at a relative pressure (P/Po) of 0.25. The total pore volumes were estimated from the amount adsorbed at a relative pressure (P/Po) of 0.99. The pore size distribution, average pore size, and DFT pore volumes were calculated based on the NLDFT model on carbon at 77 K assuming the slit pore geometry. The standard error of the fitting using the NLDFT model was less than 2%.

Electrode fabrication and electrochemical tests: For the three-electrode electrochemical test, the supercapacitor electrode was prepared by casting the slurry containing 80% active materials, 10% SuperP, and 10% Polyvinylidene fluoride (PVDF) in 1-methyl-2-pyrrolidone (NMP) onto the surface of a glassy carbon electrode. After drying the electrode in an oven at 60° C., the electrochemical measurements were carried out in 1 M $H_2SO_4$. A platinum sheet and a saturated Ag/AgCl electrode were used as the counter and the reference electrode, respectively. Cyclic voltammetry was performed for the two-electrode configuration. The slurry containing 80% active materials, 10% SuperP, and 10% PVDF in NMP was pasted onto the Pt foil. The electrodes were dried in a vacuum oven at 60° C. for 24 h. A filter membrane, immersed in 1 M $H_2SO_4$ for 1 h, was used as the separator. Then the cell was tightly clamped. The galvanostatic charge/discharge tests were performed on a battery test station. The material-based specific capacitance was calculated from the discharge curves by the following relation: $C=2It/(mV)$, where I is the charge/discharge current, t is the discharge time, m is the mass of the active materials on each electrode, V is potential after the deduction of the IR drop. The energy density and the power density were calculated using the equations: energy density $E=\frac{1}{8}CV^2$ and power density $P=IV/(2m)$.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A method for synthesizing a graphene-polyaniline hybrid composite, comprising:
   a) functionalizing the surface of a graphene substrate with aniline groups; and
   b) polymerizing the aniline groups to yield a graphene-polyaniline hybrid material;
   wherein the graphene-polyaniline hybrid composite has a specific surface area of 127 $m^2$/g, a pore volume of 0.56 $cm^3$/g, and an average pore size of 37.5 nm,
   wherein during a), a thin film of aniline is formed on the graphene body; and
   wherein during b), a plurality of vertically aligned polyaniline rods are formed.

2. The method of claim 1 and further comprising:
   c) before a), oxidatively exfoliating natural graphite flakes to yield a graphene body;
   wherein during a), the surface of the graphene body is functionalized with aniline groups via a diazonium reaction; and
   wherein during b), covalently-grafted polyaniline-graphene composites are formed by in-situ polymerization of aniline in the presence of aniline-functionalized graphene oxide, an oxidant, and an acid dopant.

3. The method of claim 2 wherein the covalently-grafted polyaniline-graphene composites have aniline-to-graphene oxide weight ratios between about 1:1 and about 10:1.

4. A method for synthesizing a graphene-polyaniline hybrid composite, comprising:
   a) oxidatively exfoliating natural graphite flakes to yield a graphene substrate;
   b) functionalizing the surface of the graphene substrate with aniline groups;
   c) polymerizing the aniline groups to yield a graphene oxide-polyaniline hybrid material; and
   d) forming a plurality of vertically aligned polyaniline nanorods extending from the graphene oxide-polyaniline hybrid material;

wherein the graphene oxide-polyaniline hybrid composite has a specific surface area of at least about 127 $m^2/g$, a pore volume of at least about 0.56 $cm^3/g$, and an average pore size of about 37.5 nm;

wherein during c), covalently-grafted polyaniline-graphene composites are formed by in-situ polymerization of aniline in the presence of aniline-functionalized graphene oxide, an oxidant, and an acid dopant.

5. The method of claim 4 wherein the plurality of nanorods is uniformly distributed about the graphene oxide-polyaniline hybrid composite.

* * * * *